(12) United States Patent
Cheong et al.

(10) Patent No.: US 6,604,173 B1
(45) Date of Patent: Aug. 5, 2003

(54) SYSTEM FOR CONTROLLING ACCESS TO EXTERNAL CACHE MEMORIES OF DIFFERING SIZE

(75) Inventors: Hoichi Cheong, Austin, TX (US); Dwain A. Hicks, Pflugerville, TX (US); George M. Lattimore, Austin, TX (US); Peichun P. Liu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1196 days.

(21) Appl. No.: 08/560,227

(22) Filed: Nov. 21, 1995

(51) Int. Cl.[7] .............................................. G06F 12/04
(52) U.S. Cl. ...................... 711/119; 711/154; 711/212
(58) Field of Search ........................... 395/448, 421.02, 395/497.01, 403; 711/118, 119, 121, 130, 200, 212, 154

(56) References Cited

U.S. PATENT DOCUMENTS 5,014,195 A * 5/1991 Farrell et al. ................ 364/200
5,175,833 A * 12/1992 Yarkoni et al. .............. 395/425
5,542,062 A * 7/1996 Taylor et al. ................ 395/403
5,553,258 A * 9/1996 Godiwala et al. ........... 395/403

* cited by examiner

Primary Examiner—Tuan V. Thai

(57) ABSTRACT

A method for controlling access to at least one external cache memory in a processing system, the at least one external cache memory having a number of lines of data and a number of bytes per line of data, the method includes determining a smallest cache memory size for use in the at least one external cache memory, and configuring a tag array of the at least one external cache memory to support the smallest determined cache memory size. A system for controlling access to at least one external cache memory in a processing system, the at least one external cache memory having a number of lines of data and a number of bytes per line of data, includes a circuit for configuring each tag field of a plurality of tag fields in a tag array in the at least one external cache memory to have a number of bits sufficient to support a smallest determined cache memory, and utilizing each tag field to determine whether data being accessed resides in the at least one external cache memory.

10 Claims, 2 Drawing Sheets

SYSTEM FOR CONTROLLING ACCESS TO EXTERNAL CACHE MEMORIES OF DIFFERING SIZE

FIELD OF THE INVENTION

The present invention relates to cache memories, and more particularly to controlling access to external cache memories in a computer system.

BACKGROUND OF THE INVENTION

One of the typical components to increase the speed of computer systems are cache memories. The cache memories serve as smaller, faster storage areas and include data that is also stored in the main memory in a computer system, and usually contain data that may be more frequently accessed by the computer system to increase the speed at which the computer's processor operates. Various methods and systems have been conventionally used to organize the correspondence between the main memory and cache memory structures. One form of organizing a cache memory is known as direct-mapping.

In direct-mapping, the data held in the main memory is designated as a series of blocks. For example, in a 64 Kbyte main memory addressable by a 16-bit address line, 4 Kbyte blocks with 16 words per block is suitable. Similarly, a cache memory is divided into a series of blocks, for example, a 2 Kbyte cache memory is suitably divided into 128 blocks with 16 words per block. Because of the reduced size of the cache memory in comparison to the main memory, multiple blocks within the main memory are allotted the same potential blocks for storage within the cache memory. For example, with the 64 Kbyte main memory and 2 Kbyte cache memory described, blocks 0, 128, 256, etc. of the main memory are suitably mapped into block 0 of the cache memory. With this configuration, the address of the data in main memory is used as an indexer for the cache memory. With the example described above, the 16-bit address line is suitably divided to have seven bits address the 128 blocks of the cache memory, four lowest order bits to identify which of the 16 bytes within each cache memory block is desired, and the remaining five most significant bits as a tag field. Thus, the unique identifier provided by the tag field is utilized to determine whether a tag field of a block in the cache memory matches an incoming tag field of an address.

With direct-mapping schemes, the bit-by-bit comparison performed between the tag field of the address and the stored tags of the cache memory data verifies the presence of the data in the cache memory. While direct-mapping schemes are adequate for many systems, in some systems, cache memories of varying sizes may be used. In such systems, the number of bits required to address the cache memory data varies, so that the size of the tag field varies for each different cache memory size. Special considerations, such as the use of a mode bit, are often used to designate which size tag field is suitable for the cache memory being accessed. Unfortunately, the complexity of such systems is increased thus reducing the speed of access to the cache memories.

A need exists for a flexible and efficient system for accessing cache memories that accommodates cache memories of differing size. The present invention addresses such a need.

SUMMARY OF THE INVENTION

The present invention provides method and system aspects to control access to external cache memories of differing size. In a method aspect for controlling access to at least one external cache memory in a processing system, at least one external cache memory having a number of lines of data and a number of bytes per line of data, the method includes determining a smallest cache memory size for use in at least one external cache memory, and configuring a tag array of at least one external cache memory to support the smallest determined cache memory size.

The method further includes having the tag array include a plurality of tag fields, each tag field associated with each line of data of at least one external cache memory, and utilizing the tag array to determine whether data being accessed resides in at least one external cache memory. In addition, utilizing the tag array further includes determining whether a match exists between a tag of an incoming address and the tag array. Also, configuring each tag field further includes allotting a number of bits for each tag field, such that the number of bits is the number of bits required to uniquely identify the data in the smallest determined cache memory size.

In a system aspect of the present invention, a system for controlling access to at least one external cache memory in a processing system, at least one external cache memory having a number of lines of data and a number of bytes per line of data, includes a circuit for configuring each tag field of a plurality of tag fields in a tag array in at least one external cache memory to have a number of bits sufficient to support a smallest determined cache memory, and utilizing each tag field to determine whether data being accessed resides in at least one external cache memory.

With the present invention, a flexible and efficient system for accessing cache memories that accommodates cache memories of differing size is achieved. The system capably handles cache memories of any size above a predetermined smallest size by effectively recognizing and taking to advantage the relationship between the size of the cache memory structure and width of the tag field. As the cache memory size decreases, the tag field width, i.e., the number of bits used to store the tag field data, increases, and vice versa. Thus, the present invention configures each tag field of the tag array to hold a maximum number of bits for a smallest cache memory size, such that the ability to access larger-sized cache memories is not diminished.

These and other advantages of the aspects of the present invention will be more fully understood in conjunction with the following detailed description and accompanying drawings.

DETAILED DESCRIPTION

The present invention relates to efficiently accessing cache memory structures of various size. The following description is presented to enable one of ordinary skill in the art to make and use the invention and is provided in the context of a patent application and its requirements. Various modifications to the preferred embodiment and the generic principles and features described herein will be readily apparent to those skilled in the art.

It should be appreciated that although the following description refers to a first and second level cache memory, the present invention is equally applicable in those systems that include one or more external (second-level) cache memories and that may not include an on-chip (first-level) processor cache memory. Further, the sizes of the cache memories and the address scheme are also merely one example of a possible system setup. Therefore, the description in conjunction with the drawings is illustrative and not restrictive of the present invention.

Figure 1:
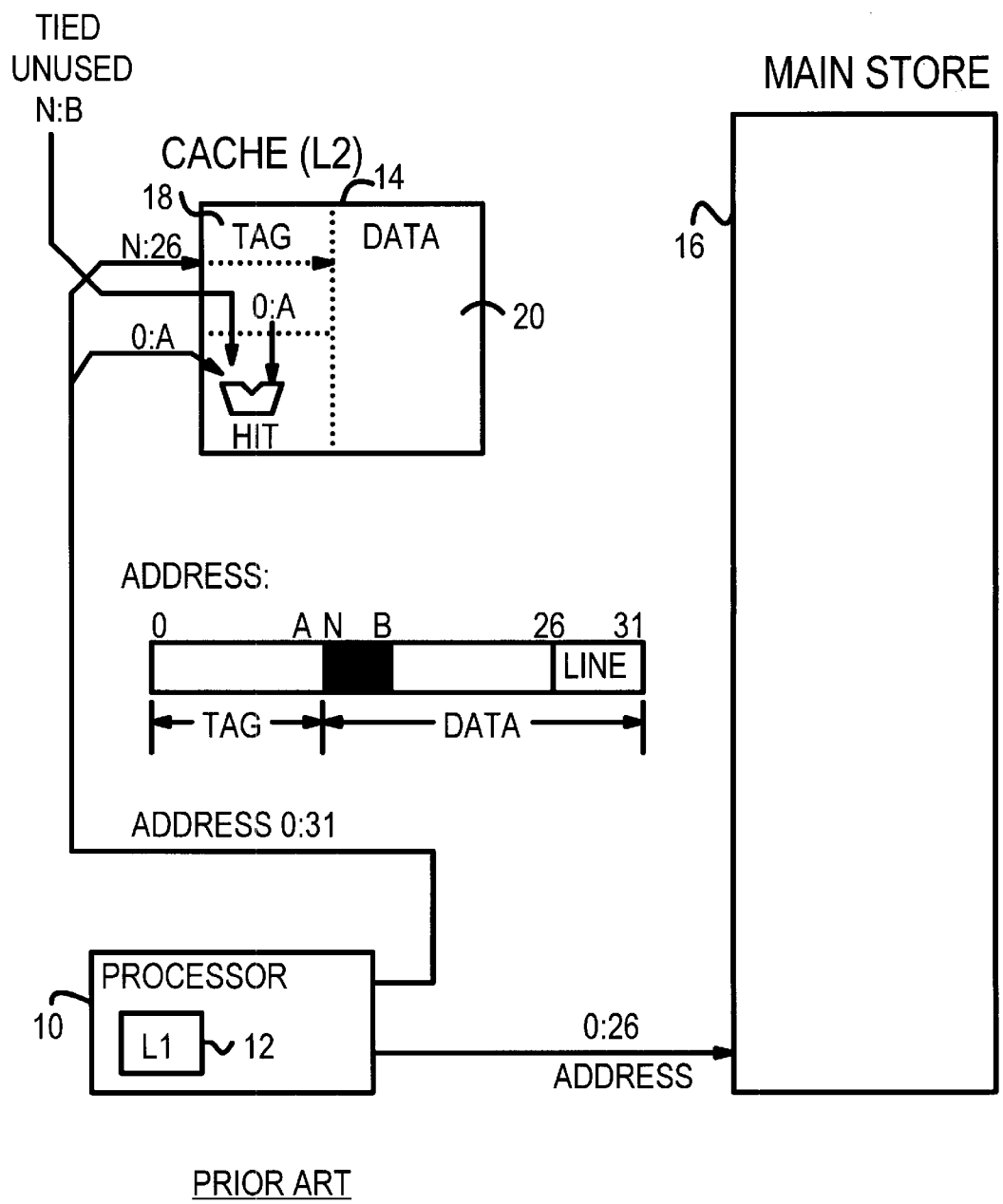
FIG. 1 illustrates a partial block diagram of a prior art processing system that includes a first and second level cache memory.

FIG. 1 illustrates a partial block diagram of a prior art processing system that includes a processor 10 with a first level cache memory (L1) 12, a second level cache memory (L2) 14, and a main memory store 16. Typically, first level cache memory 12 is much smaller than second level cache memory 14 in order to fit in the processor package. As described above, the second level cache memory 14 is conventionally a smaller, faster memory used to hold some smaller portion of the main memory 16, so as to reduce the time spent on read or write operations by the processor 10. Cost and performance considerations are usually optimized by choosing an appropriate amount of second level cache memory 14 for a system.

As shown in FIG. 1, in a preferred embodiment, the second level cache memory 14 includes a Tag array 18 and a chosen number of data array chips 20. The chosen number of data array chips 20 suitably provide the desired amount of storage for the cache memory 14. The number of bits needed to address the data array 20 varies depending upon the chosen size of data array 20, as is well understood by those skilled in the art. For example, with a 64 Kbyte cache memory 14, 16 address bits of the 32-bit address line (0:31) of processor 10 are required to access the data array 20. The Tag array 18 must then be capable of holding the remaining 16 bits of the address line as a tag field for each entry in the data array 20. By further example, if a 128 Kbyte cache memory 14 is used, the data array 20 requires 17 address bits, and the Tag array must then be capable of storing a 15 bit tag field for each entry, as is well understood by those skilled in the art.

As previously described, when accessing a direct-mapped memory system, the address bits 0:31 are typically divided into segments, data and tag, to determine whether the data sought is held in the cache memory 14. The data segment usually contains the number of bits necessary to address the data array 20, including each byte of each line of data. For example, using address bits N:26 determines which line of data array 20 is being accessed, while using bits 27:31 determines which byte of the chosen line is being accessed, with the number of bytes per line being system dependent. The remaining bits of the address, bits 0:A, where A=(N−1), are used as the tag bits. The tag bits (0:A) are suitably compared with the data in each tag field of the Tag array 18 to verify that the line being accessed in the data array 20 actually contains the data sought and addressed by address bits 0:31.

With prior art systems, the flexibility to change the size of the cache memory or to have multiple cache memories of differing size is limited, since the system would be required to support the performing of comparisons for a wide range of address bit configurations in the differing size tag fields. Some systems have attempted to accommodate differing cache memory sizes by including mode bit(s) to indicate which size cache memory is present, as is well understood by those skilled in the art. For example, bits N:B of the address line suitably act to personalize each configuration and indicate how many bits of the address line are necessary as tags, i.e., to indicate the value of N for each configuration. Unfortunately, the increase in complexity for the hardware that results from requiring these special mode bits increases the cost and size of the system, and typically reduces the speed of access to the cache memories.

Figure 2:
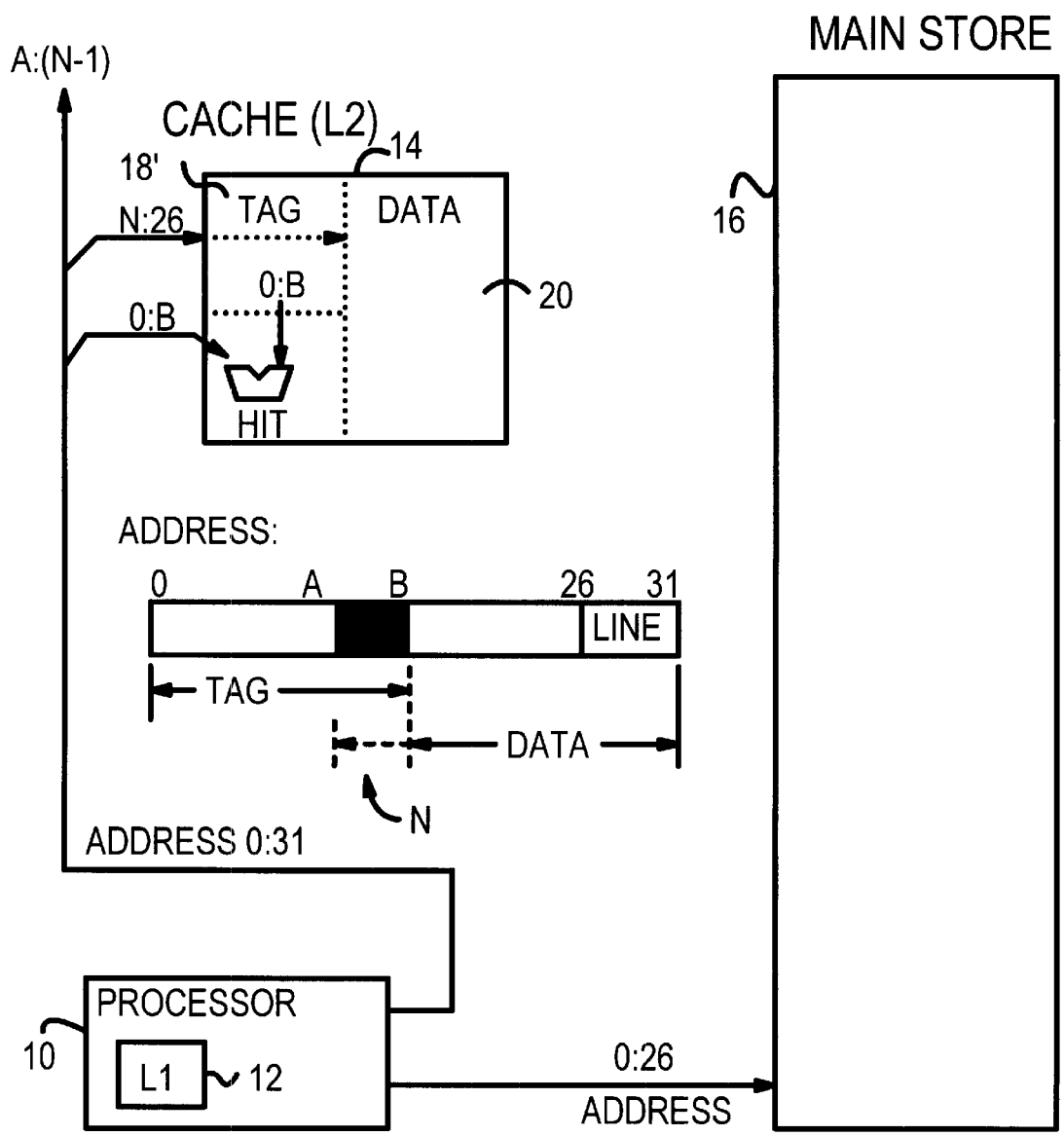
FIG. 2 illustrates a partial block diagram of a processing system that includes a first and second level cache memory in accordance with the present invention.

The present invention overcomes such problems in a straightforward and efficient manner. As illustrated in FIG. 2, in which like components have been similarly labeled to FIG. 1, the present invention utilizes an improved Tag array 18' configuration and address line segmentation to accommodate flexible cache memory sizing. In accordance with the present invention, the Tag array 18' is chosen to have the maximum number of bits per tag field required for the smallest determined cache memory size. Thus, bits 0:B of address bits 0:31 comprise the tag field bits for each cache memory configuration in the system, such that 0:B is the number of bits required for the tag field of the smallest system cache memory. Of course, for the systems having a size greater than the smallest cache memory size, there is redundancy between the tag bits being compared and the data bits addressing the cache memory. Such redundancy, however, does not hamper access to these larger cache memories.

As FIG. 2 further illustrates, the maximum range of the data segment of the address bits is A:31, where A is less than or equal to B. The actual number of bits used in the data segment is designated as N:31, where A≦N≦B. The number of bits in the byte line portion of the data segment is system dependent and determined by the number of bytes per line in the data array 20. By way of example, the byte line portion comprises bits 27:31 of the address bits.

With the present invention, no special indicators are required to designate which size cache memory is present. Rather, the system capably handles cache memories of any size above a predetermined smallest size by configuring the tag array to hold a maximum number of bits for a smallest cache memory size. Although cache memories above the smallest size have redundancy between a certain number of the least significant bits of the tag field and the most significant bits of the data field, such redundancy does not diminish performance in retrieving the correct data from the cache memory.

Further, the present invention effectively recognizes and takes to advantage the relationship between the size of the cache memory structure and width of the tag field. As the cache memory size decreases, the tag field width, i.e., the number of bits used to store the tag field data, increases, and vice versa. Utilizing this relationship, the present invention allows configuration of cache(s) in a processing system to provide support for a smallest cache memory size, while not detrimenting the access of cache memories larger than this smallest size.

Although the present invention has been described in accordance with the embodiments shown, one of ordinary skill in the art will recognize that there could be variations to the embodiment and those variations would be within the spirit and scope of the present invention. For example, although the prior art has been described in terms of a configuration using mode bit(s), indication of cache memory size may also be performed through a suitable software routine. Of course, such routines also increase the complexity of system operations for accessing cache memories. Accordingly, many modifications may be made by one of ordinary skill without departing from the spirit and scope of the present invention, the scope of which is defined by the following claims.

What is claimed is:

1. A method for controlling access to at least one external cache memory in a processing system, the at least one external cache memory having a number of lines of data and a number of bytes per line of data, the method comprising:

identifying a predetermined smallest cache memory that is provided in the processing system;

configuring a tag array comprising a plurality of tag fields of each external cache memory in the processing system to store a fixed number of tag bits based on the predetermined smallest cache memory; and wherein duplication of tag bits can be utilized for different size of cache memories.

2. The method of claim 1 wherein each tag field is associated with each line of data of the at least one external cache memory.

3. The method of claim 2 wherein the step of configuring further comprises allotting a number of bits for each tag field, wherein the number of bits is the number of bits required to uniquely identify the data in the predetermined smallest cache memory.

4. The method of claim 1 further comprising utilizing the tag array to determine whether data being accessed resides in the at least one external cache memory.

5. The method of claim 4 wherein utilizing the tag array further comprises determining whether a match exists between a tag of an incoming address and the tag array.

6. The method of claim 5 wherein when a match does not exist, the data being accessed does not reside in the at least one external cache memory.

7. A system for controlling access to at least one external cache memory in a processing system, the at least one external cache memory having a number of lines of data and a number of bytes per line of data, the system for controlling access comprising:

a circuit, the circuit including a processor coupled to the at least one external cache memory by a plurality of address bit for accessing data in the at least one external cache memory, wherein each tag field of a plurality of tag fields in a tag array in the at least one external cache memory has a fixed number of bits sufficient to support a predetermined smallest system cache memory;

each tag field is compared to a same number of address bits to determine whether data being accessed resides in the at least one external cache memory; and duplication of tag bits can be utilized for different size of cache memories.

8. The system of claim 7 wherein each tag field is associated with each line of data in the at least one external cache memory.

9. The system of claim 7 wherein each tag field is allotted a maximum number of bits necessary to support the smallest system cache memory.

10. The system of claim 7 wherein the data being accessed resides in the at least one external cache memory when one of the plurality of tag fields matches a tag of an incoming address.

* * * * *